United States Patent
Belschner et al.

(10) Patent No.: US 10,237,871 B2
(45) Date of Patent: Mar. 19, 2019

(54) DECENTRALIZED SCHEDULING METHOD FOR MOBILE NETWORKS WITH BURSTY TRAFFIC

(71) Applicant: Deutsche Telkom AG, Bonn (DE)

(72) Inventors: Jakob Belschner, Frankfurt (DE); Oscar D. Ramos-Cantor, Darmstadt (DE)

(73) Assignee: DEUTSCHE TELKOM AG, Bonn (DE)

(*) Notice: Subject to any disclaimer, the term of this patent is extended or adjusted under 35 U.S.C. 154(b) by 28 days.

(21) Appl. No.: 15/381,142

(22) Filed: Dec. 16, 2016

(65) Prior Publication Data

US 2017/0181170 A1 Jun. 22, 2017

(30) Foreign Application Priority Data

Dec. 18, 2015 (EP) .................. 15201092

(51) Int. Cl.
*H04W 72/04* (2009.01)
*H04L 12/851* (2013.01)
*H04W 72/08* (2009.01)
*H04L 5/00* (2006.01)

(52) U.S. Cl.
CPC ..... *H04W 72/0453* (2013.01); *H04L 47/2441* (2013.01); *H04W 72/04* (2013.01); *H04W 72/082* (2013.01); *H04L 5/0007* (2013.01); *H04L 5/0044* (2013.01)

(58) Field of Classification Search
CPC .............................................. H04W 72/0453
See application file for complete search history.

(56) References Cited

U.S. PATENT DOCUMENTS

| | | | |
|---|---|---|---|
| 2008/0090583 A1* | 4/2008 | Wang | H04W 72/121 455/452.1 |
| 2008/0205260 A1 | 8/2008 | Lee et al. | |
| 2009/0080379 A1 | 3/2009 | Takashima | |
| 2009/0303937 A1* | 12/2009 | Sawahashi | H04L 5/0064 370/329 |
| 2010/0157913 A1 | 6/2010 | Nagata et al. | |
| 2011/0044228 A1* | 2/2011 | Song | H04W 72/005 370/312 |

(Continued)

FOREIGN PATENT DOCUMENTS

EP 2665219 A1 11/2013

*Primary Examiner* — Jason E Mattis
(74) *Attorney, Agent, or Firm* — Leydig, Voit & Mayer, Ltd.

(57) ABSTRACT

A method for allocating communication resources for communication between a transmitter and a receiver in a multi-user cellular communication system, wherein the communication resources are divided into frequency sub-bands, includes: classifying, based on a configuration parameter, part of the frequency sub-bands as frequency-sub-bands for carrying bursty traffic; and using the remaining part of the frequency sub-bands as frequency-sub-bands for carrying long-term transmission traffic. The communication resources are divided into the frequency sub-bands for at least a sub-group of base stations (BSs) of the system or all the BSs of the system in the same manner such that all the BSs of the sub-group or all the BSs of the system use the same frequency sub-bands for bursty traffic.

10 Claims, 1 Drawing Sheet

(56) References Cited

U.S. PATENT DOCUMENTS

| | | | |
|---|---|---|---|
| 2012/0028664 A1* | 2/2012 | Zhang | H04W 16/14 455/501 |
| 2013/0301541 A1* | 11/2013 | Mukherjee | H04W 74/0833 370/329 |
| 2014/0341181 A1* | 11/2014 | Sarkar | H04W 74/006 370/331 |
| 2016/0302185 A1* | 10/2016 | Sun | H04W 74/08 |

* cited by examiner

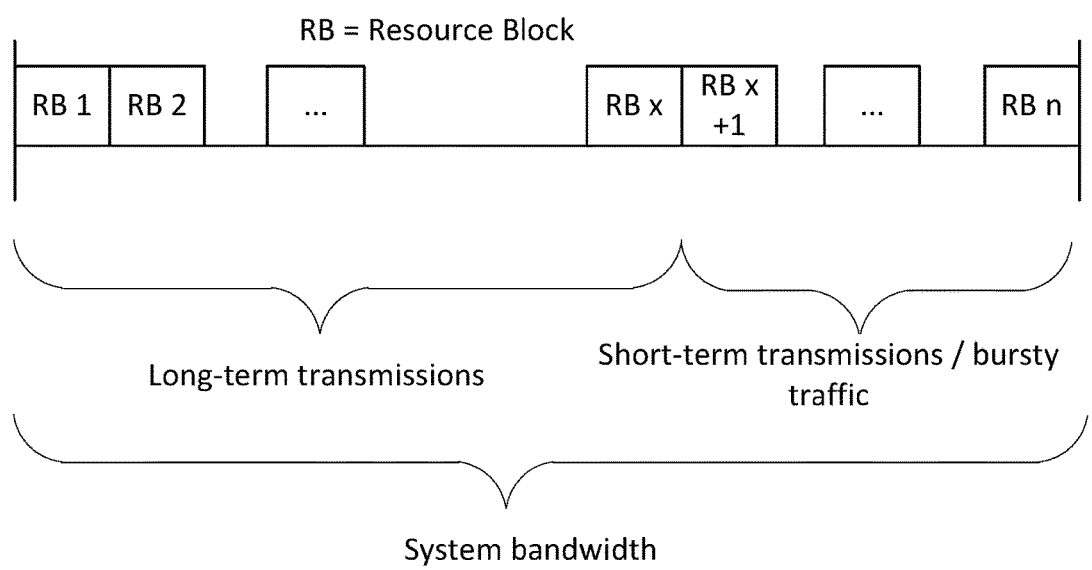

DECENTRALIZED SCHEDULING METHOD FOR MOBILE NETWORKS WITH BURSTY TRAFFIC

CROSS-REFERENCE TO RELATED APPLICATIONS

Priority is claimed to European Patent Application No. EP 15 20 1092.2, filed on Dec. 18, 2015, the entire disclosure of which is hereby incorporated by reference herein.

FIELD

The present invention relates to a decentralized scheduling method and system for mobile networks with bursty traffic, and more particularly to allocating communication resources for communication between a transmitter and a receiver in a multi-user cellular communication system.

BACKGROUND

Today's mobile networks serve a high number of users, equipped e.g. with smartphones, tablets and notebooks. In addition, more and more machines and Internet of things (IoT) also transmit and receive data through wireless networks. The result is a very diverse traffic in the network: it ranges from data transfers with high volume that last for a relatively long time span (e.g. a file download that takes several minutes) to very short transmissions (e.g. a text message of 140 characters). This mix of different data packet streams is transported through one common mobile network.

The mobile network (e.g. a Long Term Evolution (LTE) network) operates in a certain frequency band for which the operator of the network holds a license. An important target is to transmit the data in this frequency band in a very effective manner such that the amount of data transmitted and received is maximized. A measure for this effectiveness is the so-called spectral efficiency. It describes how many data bits a transmitter can transfer to the receiver in a certain time and on a certain frequency band. The maximization of the spectral efficiency is particularly achieved by an adaptive modulation and coding. Depending on the signal-to-interference-and-noise ratio (SINR) the receiver experiences, the transmitter adapts certain parameters of the transmission-particularly, the modulation scheme, the coding rate and the multiple-input multiple-output (MIMO) scheme. The higher the SINR, the more bits a transmission can transfer in a certain timeframe on a certain frequency band. However, this principle implies a risk: in case the transmitter does not estimate the SINR at the receiver correctly, it might select inappropriate transmission parameters. This can result in an under- or overestimation of the SINR. In the first case, the transmission is not as efficient as it could be, i.e. less data is transmitted than it would actually be possible. The latter case is more problematic: due to higher interference at the receiver, the transmitted data cannot be decoded at the receiver. The data is either lost or has to be retransmitted.

Both problems limit the spectral efficiency of the system. The situation is especially problematic in the presence of so-called bursty traffic. Bursty traffic originates from short transmissions as illustrated in the following example:

Mobile station (MS) 1 is attached to a base station (BS) 1. MS 1 downloads a large file and results in a relatively long duration of data transmission from BS 1 to MS 1. To make this data transmission as efficient as possible, BS 1 constantly estimates the current SINR at MS 1 and adapts the transmission parameters accordingly. However, the estimation always follows a certain delay, such that BS 1 is never aware of the real instantaneous SINR at MS 1. In case a BS 2 starts a data transmission to an MS 2 in the same frequency band, this will interfere with MS 1 and reduce the SINR at MS 1. This may then cause decoding errors in the receiver of MS 1 and thus data loss. After a certain time, BS 1 has adapted to the new situation e.g. by lowering the modulation scheme. In case BS 2 stops its transmission, BS 1 again needs a certain time to adapt to the improved situation. The most problematic case is caused by a constant on/off behavior of BS 2. In that case, BS 1 can never adapt to the correct situation. A constant on/off behavior can especially be caused by services with a relatively low data rate and small transmissions from time to time e.g. chat-services, downloads of web pages with many different elements that are transmitted independently.

The problems caused by bursty traffic have already been pointed out previously. There are also existing solutions available in the market, which will be described as below.

Solution 1: Adaptation of Transmission Parameters and Machine Learning

It is possible to limit the effects of bursty traffic by adapting transmission parameters in advance. It is for example possible to use a lower modulation scheme than the currently estimated best one in order to avoid decoding problems due to unexpected interference. However, this will reduce the spectral efficiency. In addition it is possible to enhance this principle by machine learning techniques. In case an interferer has a predictable behavior, a future transmission of this interferer can be taken into account. A drawback is the complexity of such methods and the probability of erroneous predictions.

Solution 2: Coordination

Coordination between BSs is a solution for the problems described above. In a downlink direction (for traffic from a BS to an MS) a BS can inform neighboring BSs about simultaneous transmissions that cause interference. As a result a BS can take into account such interference when selecting the transmission parameters. Also in an uplink direction (for traffic from an MS to a BS) this principle can be applied, e.g. such that BS 1 receives information from BS 2 about ongoing uplink transmissions and BS 1 forwards this information to its attached MSs. Coordination can also happen through a central controller.

However, there are certain drawbacks of such coordination. The information exchange between the BSs is typically subjected to delays. This is the case, as connections between BSs (e.g. through fiber optics) often do not follow the direct path but undergo switching and/or routing. The delay might then again cause the BSs to be unaware of the real-time situation in other BSs. Consequently, this results in implementation effort and cost for the required hard- and software.

Examples for existing coordination techniques are cited in
[1] Ahmed, M. H., Yanikomeroglu, H., Mahmoud, S., & Falconer, D. (2002). Scheduling of multimedia traffic in interference-limited broadband wireless access networks. In The 5th International Symposium on Wireless Personal Multimedia Communications (Vol. 3, pp. 1108-1112). IEEE, and http://doi.org/10.1109/WPMC.2002.1088350
[2] US2012/0027108

SUMMARY

In an exemplary embodiment, the present invention provides a method for allocating communication resources for communication between a transmitter and a receiver in a multi-user cellular communication system, wherein the communication resources are divided into frequency sub-bands. The method includes: classifying, based on a configuration parameter, part of the frequency sub-bands as frequency-sub-bands for carrying bursty traffic; and using the remaining part of the frequency sub-bands as frequency-sub-bands for carrying long-term transmission traffic. The communication resources are divided into the frequency sub-bands for at least a sub-group of base stations (BSs) of the system or all the BSs of the system in a same manner such that all the BSs of the sub-group or all the BSs of the system use the same frequency sub-bands for bursty traffic.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing, which illustrates the following:

FIG. 1 is a view of a split of the system bandwidth according to the embodiment of the present invention.

DETAILED DESCRIPTION

In view of the above drawbacks, the present invention significantly reduces the effect of interference caused by bursty traffic, particularly since it does not require any cooperation between BSs, which means it is able to specifically avoid the costs caused by implementing cooperation. Nevertheless, in accordance with another aspect of the present invention, a very limited cooperation may be included in order to extend the functionality of the present invention.

In an exemplary embodiment, the present invention provides a method for allocating communication resources for communication between a transmitter and a receiver in a multi-user cellular communication system, wherein communication resources may be frequency sub-bands. The method may further comprise classifying, based on a configuration parameter, part of the frequency sub-bands as frequency-sub-bands carrying bursty traffic; and using the remaining part of the frequency sub-bands as frequency-sub-bands carrying long-term transmission traffic.

The method may further comprise, after performing the classification of the frequency sub-bands, selecting a plurality of transmission parameters for the frequency-sub-bands carrying bursty traffic. The selection of the plurality of transmission parameters for the frequency-sub-bands carrying bursty traffic may be based on a modulation scheme which is robust to a high level of interference.

The division of the communication resources into frequency sub-bands may include defining a group of communication resources, physical resource blocks (PRBs) to be used only for bursty traffic at any one time. The configuration parameter may be a size of the part of the frequency sub-bands carrying bursty traffic. The division of the communication resources into frequency sub-bands, may further include dividing the communication resources for at least a larger sub-group of the base stations (BSs) of the system or all the BSs of the system in the same manner, such that all BSs use the same frequency sub-bands for bursty traffic.

The configuration parameter may be a static setting that is defined by a network operator for an overall network. The configuration parameter may be a setting which is negotiated in a network between the BSs or in a large cluster of BSs.

The method may further comprise sending periodic information to all other BSs about the size of the part of the frequency sub-bands required for carrying bursty traffic. The method may further comprise configuring the BSs to use a highest value among the received size of the part of the frequency sub-bands carrying bursty traffic. The method may further comprise designating two or more parts of the frequency sub-bands to bursty traffic.

In another exemplary embodiment, the present invention provides a system for allocating communication resources for communication between a transmitter and a receiver in a multi-user cellular communication system, wherein communication resources may be frequency sub-bands.

The system may further comprise a device configured to classify, based on a configuration parameter, part of the frequency sub-bands as frequency-sub-bands carrying bursty traffic; and classify the remaining part of the frequency sub-bands as frequency-sub-bands carrying long-term transmission traffic.

The system may further comprise a device configured to select a plurality of transmission parameters for the frequency-sub-bands carrying bursty traffic, after the classification of the frequency sub-bands is performed.

The device may be configured to select the plurality of transmission parameters for the frequency-sub-bands carrying bursty traffic based on a modulation scheme which is robust to a high level of interference. The communication resources may be divided into frequency sub-bands by defining a group of communication resources (RBs) to be used only for bursty traffic at any one time.

The device may be configured to divide the communication resources into frequency sub-bands, and is further configured to divide the communication resources for at least a larger sub-group of the base stations (BSs) of the system or all the BSs of the system.

The configuration parameter may be a size of the part of the frequency sub-bands carrying bursty traffic. The configuration parameter may be a static setting that is defined by a network operator for an overall network. The configuration parameter may be a setting which is negotiated in a network between the BSs or in a large cluster of BSs.

The system may further comprise a device configured to send periodic information to all other BSs about the size of the part of the frequency sub-bands required for carrying bursty traffic. The system may further comprise a device adapted to configure the BSs to use a highest value among the received size of the part of the frequency sub-bands carrying bursty traffic. The system may be configured to designate two or more parts of the frequency sub-bands to bursty traffic.

In accordance with another exemplary embodiment, the present invention provides a base station for use in a multi-user cellular communication system. The base station may further comprise a device configured to execute the method for allocating communication resources as described above for uplink and downlink communication.

In accordance with another exemplary embodiment, the present invention provides a mobile station for use in a multi-user cellular communication system. The mobile station may be configured to perform uplink communication to a base station using communication resources allocated by the base station according to the method as described above.

Exemplary Advantageous Effects of Invention

According to the present invention, the BSs are using only the designated frequency band for the transmission of bursty traffic, thereby making it possible to avoid a long-term transmission in a BS 1 being interfered by bursty transmissions from any other BS.

Further, by choosing a modulation scheme which is robust to a high level of interference, the spectral efficiency of the short-term transmissions is reduced and in turn also reduces error probability and avoids retransmission. The effect of the reduction in spectral efficiency is considered to be rather low, as bursty traffic often consists of very small data packets that account only for a small fraction of the system throughput. The reduced error-probability in contrast is considered as beneficial especially for the customer experience and provides more reliable services and reduces delay due to avoidance of retransmissions.

Alternatively, said configuration parameter can also be a setting that is negotiated in the whole network or a large cluster of BSs between BSs. In the latter option, the BS sends out periodic information to all other BSs about the size of the frequency band it requires for bursty traffic and all BSs are then configured to use the highest value out of the received values and its own value. In addition, the BSs use the same frequency sub-bands for bursty traffic. This results in a kind of cooperation, but the requirements of the cooperation are significantly lower than in the coordination techniques in the state of the art. Full base station coordination typically requires an information exchange between BSs with delays in the order of milliseconds (or below) and several messages exchanged per second. Consequently, the present invention can operate with an update of the configuration parameters in the timeframe of minutes or hours and is not sensitive to delays.

An underlying idea of the invention is depicted in FIG. 1. The system bandwidth is divided into two parts: One fraction for short-term transmissions or bursty traffic and the remaining part for transmissions of longer duration. In Orthogonal Frequency Division Multiple Access (OFMDA) systems, such as LTE, such a split can easily be implemented by defining that a group of Physical Resource Blocks (PRBs) is used for bursty traffic only, at any time.

This division of the band should happen at all BSs of the system or at least a larger sub-group of BSs in the same way. The BSs will then use only the designated frequency band for the transmission of bursty traffic. As a result, it can be avoided that a long-term transmission by a BS 1 is interfered by bursty transmissions from any other BS. For long-term transmissions, the BSs can therefore select transmission parameters that achieve the highest spectral efficiency. It might happen that a BS 2 starts a long-term transmission while a BS 1 is already sending to MS 1. Thus, MS 1 even with the help of the present invention might undergo changes in interference. However, from an overall perspective, these events are rather seldom as short-term transmissions are removed from this frequency band.

Short term-transmissions are supposed to operate in the designated frequency band. Hence, it has to be expected that a more or less unpredictable interference situation may occur. Therefore, robust transmission parameters should be chosen. This can for example be a low modulation scheme which is not sensitive to interference. This reduces the spectral efficiency of such transmissions. However, in return, it also reduces the error-probability and avoids retransmissions. The effect of the reduction in spectral efficiency is considered to be rather low, as bursty traffic often consists of very small data packets that account only for a small fraction of the system throughput. The reduced error-probability in contrast is considered as beneficial especially for the customer experience and provides more reliable services and reduces delay due to avoidance of retransmissions.

The invention has one configuration parameter which is the size of the frequency band that is reserved for bursty traffic. It should be adjusted such that all short-term transmission can take place in this frequency band without congestion. It should not be larger than necessary, as otherwise the space for the highly efficient long-term transmission would be unnecessarily restricted.

The configuration parameter may be a static setting that is defined by the network operator for the overall network (undergoing certain updates if necessary). Alternatively, the configuration parameter may also be a setting which is negotiated in the whole network, or a large cluster of BSs between the BSs. In the latter option, a BS sends out periodic information to all other BSs about the size of the frequency band it requires for bursty traffic. All BSs are then configured to use the highest value out of the received values and its own value. This is a kind of cooperation, but the requirements of the cooperation are significantly lower than in the coordination techniques in the state of the art. Full base station coordination typically requires an information exchange between BSs with delays in the order of milliseconds (or below) and several messages exchanged per second. The invention can operate with an update of the configuration parameters in the timeframe of minutes or hours and is not sensitive to delays.

In a further exemplary embodiment, two or more parts of the frequency band are designated to bursty traffic. This reduces the probability that MSs undergo strong fading in a frequency band used for bursty traffic.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for allocating communication resources for communication between a transmitter and a receiver in a multi-user cellular communication system, wherein the communication resources are divided into frequency sub-bands, the method comprising:
classifying, based on a configuration parameter, part of the frequency sub-bands as frequency-sub-bands for carrying bursty traffic and a remaining part of the frequency sub-bands as frequency-sub-bands for carrying long-term transmission traffic;
dividing the communication resources into the frequency sub-bands for at least a sub-group of base stations (BSs) of the system or all the BSs of the system in a same manner such that all the BSs of the sub-group or all the BSs of the system use the same frequency sub-bands for bursty traffic;
classifying data traffic to be transmitted in the communication system as bursty traffic or as long-term transmission traffic, wherein the classifying is based on a duration required to complete a data transfer to which the data traffic to be transmitted belongs, and wherein data traffic classified as bursty traffic belongs to a data transfer requiring a shorter duration to complete than a data transfer to which data traffic classified as long-term transmission traffic belongs; and
transmitting, from at least one of the BSs of the system to a mobile station (MS), the data traffic classified as bursty traffic via the frequency-sub-bands for carrying bursty traffic and transmitting the data traffic classified as long-term transmission traffic via the frequency-sub-bands for carrying long-term transmission traffic;
wherein the configuration parameter is a setting which is negotiated in a network between the BSs or in a cluster of BSs;
wherein the method further comprises:
sending, by a BS, periodic information to all other BSs about a size of the part of the frequency sub-bands required for carrying bursty traffic for the BS; and
configuring the BSs to use a highest value among the size of the part of the frequency sub-bands required for carrying bursty traffic for the BS and received sizes of the part of the frequency sub-bands for carrying bursty traffic from other BSs.

2. The method according to claim 1, further comprising:
after classifying the part of the frequency sub-bands as frequency-sub-bands for carrying bursty traffic, selecting a plurality of transmission parameters for the frequency-sub-bands carrying bursty traffic.

3. The method according to claim 2, wherein selecting the plurality of transmission parameters for the frequency-sub-bands carrying bursty traffic is based on a modulation scheme which is robust to a high level of interference.

4. The method according to claim 1, wherein the dividing of the communication resources into frequency sub-bands comprises defining a group of physical resource blocks (PRBs) to be used only for bursty traffic.

5. The method according to claim 1, wherein the configuration parameter is a size of the part of the frequency sub-bands for carrying bursty traffic.

6. The method according to claim 1, wherein the configuration parameter is a static setting that is defined by a network operator for an overall network.

7. The method according to claim 1, wherein classifying part of the frequency sub-bands as frequency-sub-bands for carrying bursty traffic further comprises designating two or more parts of the frequency sub-bands as frequency-sub-bands for carrying bursty traffic.

8. A system for allocating communication resources for communication between a transmitter and a receiver in a multi-user cellular communication system, wherein the communication resources are divided into frequency sub-bands, the system comprising:
a plurality of base stations (BSs); and
a classifier configured to:
classify, based on a configuration parameter, part of the frequency sub-bands as frequency-sub-bands for carrying bursty traffic; and
classify the remaining part of the frequency sub-bands as frequency-sub-bands for carrying long-term transmission traffic;
wherein the communication resources are divided into frequency sub-bands for at least a sub-group of BSs of the system or all the BSs of the system in a same manner such that all the BSs of the sub-group or all the BSs of the system use the same frequency sub-bands for bursty traffic,
wherein data traffic to be transmitted in the communication system is classified as bursty traffic or as long-term transmission traffic, wherein the classifying is based on a duration required to complete a data transfer to which the data traffic to be transmitted belongs, and wherein data traffic classified as bursty traffic belongs to a data transfer requiring a shorter duration to complete than a data transfer to which data traffic classified as long-term transmission traffic belongs;
wherein at least one of the BSs of the system is configured to transmit the data traffic classified as bursty traffic to a mobile station (MS); via the frequency-sub-bands for carrying bursty traffic, and to transmit the data traffic classified as long-term transmission traffic via the frequency-sub-bands for carrying long-term transmission traffic;
wherein the configuration parameter is a setting which is negotiated in a network between the BSs or in a cluster of BSs;
wherein a BS is configured to send periodic information to all other BSs about a size of the part of the frequency sub-bands required or carrying bursty traffic for the BS;
wherein the BSs are configured to use a highest value among the size of the part of the frequency sub-bands required for carrying bursty traffic for the BS and received sizes of the part of the frequency sub-bands for carrying bursty traffic from other BSs.

9. The system according to claim 8, wherein the BS is further configured to select a plurality of transmission parameters for the frequency-sub-bands for carrying bursty traffic after the classification of the part of the frequency sub-bands as frequency-sub-bands for carrying bursty traffic.

10. A non-transitory computer-readable medium having processor-executable instructions stored thereon for allocating communication resources for communication between a transmitter and a receiver in a multi-user cellular communication system, wherein the communication resources are divided into frequency sub-bands, wherein the processor-executable instructions, when executed, facilitate the following:
classifying, based on a configuration parameter, part of the frequency sub-bands as frequency-sub-bands for carrying bursty traffic and a remaining part of the frequency sub-bands as frequency-sub-bands for carrying long-term transmission traffic;
dividing the communication resources into the frequency sub-bands for at least a sub-group of base stations (BSs) of the system or all the BSs of the system in a same manner such that all the BSs of the sub-group or all the BSs of the system use the same frequency sub-bands for bursty traffic;

classifying data traffic to be transmitted in the communication system as bursty traffic or as long-term transmission traffic, wherein the classifying is based on a duration required to complete a data transfer to which the data traffic to be transmitted belongs, and wherein data traffic classified as bursty traffic belongs to a data transfer requiring a shorter duration to complete than a data transfer to which data traffic classified as long-term transmission traffic belongs; and transmitting, from at least one of the BSs of the system to a mobile station (MS), the data traffic classified as bursty traffic via the frequency-sub-bands for carrying bursty traffic and transmitting the data traffic classified as long-term transmission traffic via the frequency-sub-bands for carrying long-term transmission traffic;

wherein the configuration parameter is a setting which is negotiated in a network between the BSs or in a cluster of BSs;

wherein the processor-executable instructions, when executed, further facilitate:

sending, by BS, periodic information to all other BSs about a size of the part of the frequency sub-bands required for carrying burst traffic for the BS; and configuring the BSs to use a highest value among the size of the part of the frequency sub-bands required for carrying bursty traffic for the BS and received sizes of the part of the frequency sub-bands for carrying bursty traffic from other BSs.

* * * * *